Patented Sept. 2, 1941

2,254,612

UNITED STATES PATENT OFFICE 2,254,612

RUBBER BONDED ABRASIVE ARTICLE AND MIX

Richard H. Martin, Worcester, Mass., assignor to Norton Company, Worcester, Mass., a corporation of Massachusetts No Drawing. Application January 22, 1940, Serial No. 315,025

3 Claims. (Cl. 51—299)

The invention relates to rubber bonded abrasive articles and mixes, and particularly to a method of preparing a readily screenable mix of abrasive grains and rubber bond.

One object of the invention is to provide a readily screenable rubber-abrasive mix whereby the molding technique for the manufacture of vitrified bonded pressed wheels may be used. Another object of the invention is to make a porous rubber bonded grinding wheel or other abrasive body. Another object of the invention is to provide a facile method for the manufacture of rubber bonded abrasive articles. Other objects will be in part obvious or in part pointed out hereinafter.

The invention accordingly consists in the features of construction, combinations of elements, and in the several steps and relation and order of each of said steps to one or more of the others thereof, all as will be illustratively described herein, and the scope of the application of which will be indicated in the following claims.

As conducive to a clearer understanding of the present invention, it may be pointed out that rubber bonded grinding wheels have a particular field of usefulness and, furthermore, the relatively low price of rubber gives them a special advantage from the grinding cost standpoint. Although many different methods of mixing the abrasive grain with the rubber have been proposed, a large number of wheels are still molded in a hot press. I have discovered a method of making a screenable, pourable mix of abrasive grains coated only with rubber as the organic bond, which mix can be kept on hand for months or even years and used as desired according to the simple technique of simply weighing out the desired quantity of the mix, introducing it into a mold, pressing under a precalculated pressure to the square inch or preferably to a fixed volume percentage of abrasive grain, bond and pores, then stripping the mold and placing the pressed article in a vulcanizing oven. In this way the mold equipment is not tied up and a large quantity of the screenable mix can be made during a given production run and used as orders are received for the manufacture of wheels or other abrasive articles as above described.

Considering now an illustrative embodiment of the method of the invention which also is illustrative of the pourable screenable mix of the invention and abrasive articles made therefrom, I provide a quantity of rubber, for example in the form of smoked sheets readily procurable on the rubber market. These smoked sheets I break down on a mill or in a Banbury mixer. I break down the rubber until it is reasonably plastic.

I now put the plasticized rubber into a kneader and heat to 160° C. Every half hour for three hours I add 0.3% by weight of duPont's RPA No. 2 which is a naphthyl beta mercaptan, viz. $C_{10}H_7SH$. At the end of three hours the rubber is liquid, having the consistency of molasses. It should be understood that by adding more RPA No. 2, a less viscous rubber will be produced and vice versa, by adding a lesser amount of RPA No. 2 a heavier and more viscous rubber will result. I prefer a viscosity about the same as that of molasses and the rubber will vary in viscosity approximately like molasses does at different temperatures.

Taking 3.24 pounds of 46 grit "Alundum" (fused alumina), I put it into a kneader and start the kneader in operation. I then pour in .39 pound of the liquid rubber produced as above described which may be taken just as it comes from the other kneader or may have cooled down. I let the kneader run for a few minutes to mix the rubber with the abrasive until each grain has been wetted with the liquid rubber. I then add .20 pound of sulphur and continue the mixing for a couple of minutes. I then add a quarter of a pound of clay and continue the mixing for two more minutes. I then add another quarter of a pound of clay and continue the mixing for three more minutes. I then add another quarted of a pound of clay and continue the mixing for four more minutes. I then add another quarted of a pound of clay and continue the mixing for six more minutes. I then add .17 pound of clay and continue the mixing for eight more minutes.

The mixing is now completed and a pourable mix has resulted. However, the grains may in some cases be stuck together, so I remove the mix from the kneader and screen it, using in the case of the 46 grit "Alundum" a No. 20 mesh screen. The result is a pourable screenable mix with practically no two abrasive grains stuck together and each abrasive grain coated with a quantity of organic bond consisting only of rubber, sulphur and filler.

Considering now the particular features of the foregoing which give the desired results, I find that for the production of a pourable, screenable, dry, granular mix, there should be used not less than 25% by volume of an inert filler, calculated on the total bond (rubber, sulphur and filler). Clay is such an inert filler, being inert at any temperatures involved in vulcanizing rubber bond. Magnesium oxide is such an inert filler, being similarly inert. Carbon black is another inert filler under the conditions of vulcanizing. I may also use cryolite, alumina (fines), silica gel, aero gel, magnesium carbonate etc. I may also use organic filler materials which have been converted to the thermoirreversible stage. For example, phenol formaldehyde having had incorporated in it enough of a hardening agent such as hexamethylenetetramine, can be polymerized by head to a thermoirreversible stage. If such a material is ground up, it makes a useful filler in accordance with my invention because at the temperature of vulcanization of the rubber bond, no further chemical reaction takes place in or with the phenol formaldehyde and, furthermore, it does not decompose. Likewise hard rubber dust may be used, that is to say the product of vulcanizing rubber with 25% or more of sulphur, then grinding the product to a fine powder. Such a hard rubber dust undergoes no further reaction when an uncured mixture of rubber, sulphur, etc., is being vulcanized with it.

With regard to the other features of the invention, the rubber may be made liquid in any way desired but that above specified gives good results in actual practice. For example, if rubber is liquefied by heat alone, its chemistry is changed sufficiently so that when vulcanized it has not quite the strength that it would have had if it had not been liquefied. However, liquefying rubber with RPA No. 2 and a moderate amount of heat, viz. 160° C., produces a liquid which will vulcanize to a strong product. When using heat alone to liquefy the rubber, a temperature of the order of 200° C. to 250° C. and even higher may be used.

With regard to the order of adding the filler, this may be varied within wide limits and, in fact, it is possible to practice the invention by merely dumping in the abrasive, the liquid rubber and the filler all at one time. However, superior results are obtained by adding the filler slowly along the general lines indicated.

Instead of adding the RPA No. 2 in the kneader, I may add it to the rubber when it is in the Banbury mixer, and wide variations of this method of producing liquid rubber can be adopted, it being sufficient to add a suitable liquefying agent, to heat the rubber to a moderate temperature such as 160° C., and to work the rubber mechanically in machines of the class indicated. Other liquefying agents which may be used are organic compounds of copper and manganese, copper oxide and manganese dioxide. It will be noted that these liquefying agents are used in small proportions and do not have to be expelled from the rubber after it is liquefied.

Any other type of abrasive material can be used, for example emery and corundum both of which are varieties of alumina, also silicon carbide produced in the electric furnace, and diamonds.

Considering the manufacture of a grinding wheel out of the pourable, screenable, dry, granular mix, it is sufficient to say that the regular technique for the manfacture of vitrified grinding wheels by the pressing method is employed. That is to say, the mix is introduced into a mold and pressed under a pressure to give the desired volume structure of abrasive grains, bond and pores, then stripped from the mold and placed in the vulcanizing oven and vulcanized at the usual vulcanizing temperatures (as distinguished from being vitrified). Any usual vulcanizing temperatures can be used, for example 150° C. or thereabouts. This, of course, is not in this respect similar to the method of making vitrified wheels since they are vitrified at temperatures of around 1200° C.

By practicing the invention, I am enabled to make a porous rubber grinding wheel, for example having up to 25% pores, and yet the organic bond is entirely rubber. So far as I am aware, no such wheels were ever made before. Rubber wheels as previously made have been very dense, having not more than 5% of pores, or else the wheels were bonded with bonds which were only in part rubber.

It will thus be seen that there has been provided by this invention a method and an article in which the various objects hereinabove set forth together with many thoroughly practical advantages are successfully achieved. As various possible embodiments might be made of the mechanical features of the above invention and as the art herein described might be varied in various parts, all without departing from the scope of the invention, it is to be understood that all matter hereinbefore set forth is to be interpreted as illustrative and not in a limiting sense.

I claim:

1. A screenable, pourable, dry, granular mix consisting of abrasive granules each coated with only rubber as an organic bond with sulphur and a filler of inert material to the extent of at least 25% by volume of the bond (rubber, sulphur and filler).

2. Method of making a screenable, pourable, dry, granular mix which consists in liquefying a quantity of rubber, mixing the liquefied rubber with abrasive grains, and adding no less than 25% by volume of the bond of an inert filler material, then mixing.

3. Method according to claim 2 in which the inert filler material is added from time to time to a mixing of abrasive grains with liquid rubber.

RICHARD H. MARTIN.